United States Patent
Chen (10) Patent No.: US 6,839,543 B1
(45) Date of Patent: Jan. 4, 2005

(54) METHOD AND SYSTEM FOR DETECTING AND DISCRIMINATING MULTIPATH SIGNALS

(75) Inventor: Ming Hui Chen, Taipei (TW)

(73) Assignee: Victory Industrial Corporation, Taipei Hsine (TW)

(*) Notice: Subject to any disclaimer, the term of this patent is extended or adjusted under 35 U.S.C. 154(b) by 167 days.

(21) Appl. No.: 08/780,555

(22) Filed: Jan. 8, 1997

Related U.S. Application Data (63) Continuation-in-part of application No. 08/709,777, filed on Sep. 9, 1996.

(51) Int. Cl.$^7$ ................................................ H04B 01/18

(52) U.S. Cl. .................... 455/65; 455/277.2; 333/21 A; 333/137

(58) Field of Search ........................... 455/63, 65, 562, 455/101, 132, 133, 134, 135, 272, 277.1, 277.2; 333/21, 125, 135, 137; 343/756, 786

(56) References Cited

U.S. PATENT DOCUMENTS

| | | | |
|---|---|---|---|
| 2,540,839 A | 2/1951 | Southworth | 250/33.63 |
| 3,566,403 A | 2/1971 | Hills | 343/5 |
| 3,955,202 A | 5/1976 | Young | 343/756 |
| 3,958,192 A | 5/1976 | Rootsey | 333/9 |
| 3,958,193 A | 5/1976 | Rootsey | 333/9 |
| 4,122,406 A | 10/1978 | Salzberg | 333/10 |
| 4,126,835 A | 11/1978 | Gould | 333/21 |
| 4,395,685 A | 7/1983 | Davies et al. | 333/125 |
| 4,516,089 A | 5/1985 | Goscianski et al. | 333/135 |
| 4,578,819 A * | 3/1986 | Shimizu | 455/135 |
| 4,700,154 A | 10/1987 | Schuegraf | 333/125 |
| 4,797,681 A | 1/1989 | Kaplan et al. | 343/786 |
| 4,849,720 A | 7/1989 | Call | 333/125 |
| 4,933,651 A | 6/1990 | Benahim et al. | 333/125 |

(List continued on next page.)

FOREIGN PATENT DOCUMENTS

TW 282873 8/1996 ............. H01Q/3/44

OTHER PUBLICATIONS

Chen et al., "A Wide–Band Square–Waveguide Array Polarizer," *IEEE Transactions on Antennas and Propagation*, vol. AP-21, pp. 389–391, (May 1973).

Derwent #010223702 WPI Acc. No. 95-124957/199517 (citing European Patent No. 0645900, published Mar. 29, 1995).

*Primary Examiner*—William G. Trost
*Assistant Examiner*—Philip J. Sobutka
(74) *Attorney, Agent, or Firm*—Fliesler Dubb Meyer & Lovejoy, LLP

(57) ABSTRACT

A wireless communication system that utilizes a circularly polarized transmitting antenna with dual orthogonal circularly polarized receiving antenna. According to some embodiments, the present invention provides a wireless communication system that includes a first transmitting antenna capable of transmitting first signals having a first type of circular polarization. The transmitting antenna is located at a first location. The system also includes a first receiving antenna capable of receiving second signals having a second type of circular polarization, where the second type of circular polarization is orthogonal to the first type of circular polarization. The system further includes a second receiving antenna capable of receiving third signals having the first type of circular polarization, and the first receiving antenna and the second receiving antenna are both located at a second location. In other embodiments, the present invention may also utilize microwave antenna systems for transmitting a circularly polarized signal and for receiving two orthogonally circularly polarized signals.

10 Claims, 5 Drawing Sheets

U.S. PATENT DOCUMENTS

| | | | |
|---|---|---|---|
| 5,298,908 A | 3/1994 | Piele | 342/363 |
| 5,343,495 A | 8/1994 | Lovell et al. | 375/1 |
| 5,374,938 A | 12/1994 | Hatazawa et al. | 343/756 |
| 5,461,394 A | 10/1995 | Weber | 343/786 |
| 5,534,882 A | 7/1996 | Lopez | 343/891 |
| 5,692,019 A * | 11/1997 | Chang et al. | 455/272 X |
| 5,701,591 A * | 12/1997 | Wong | 455/63 |
| 5,794,145 A * | 8/1998 | Milam | 455/575 X |

* cited by examiner

METHOD AND SYSTEM FOR DETECTING AND DISCRIMINATING MULTIPATH SIGNALS

CROSS-REFERENCE TO RELATED APPLICATIONS

This application is a continuation-in-part application of the patent application Ser No. 08/709,777, entitled "DUAL CIRCULARLY POLARIZED FEEDHORN ASSEMBLY," filed on Sep. 9, 1996, and having Ming Hui Chen listed as inventor, and the complete disclosure of which is hereby incorporated by reference for all purposes.

BACKGROUND OF THE INVENTION

The present invention relates to wireless communication systems. More particularly, the present invention relates to a method and apparatus for improved signal reception with less multipath interference in wireless communication systems.

Figure 1:
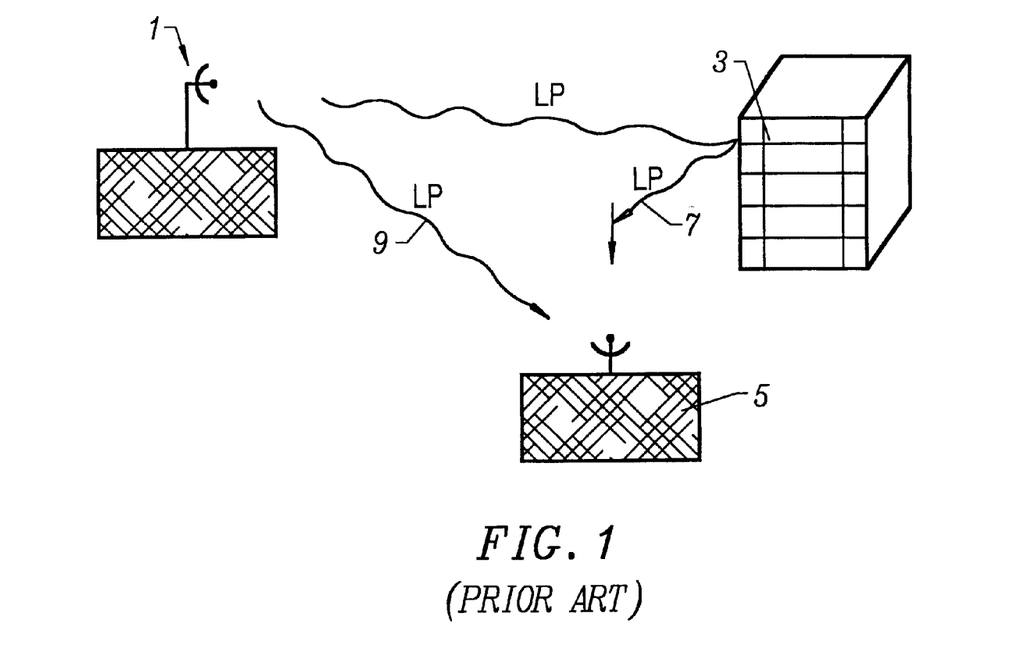
FIG. 1 is a simplified illustration of a conventional wireless communication system using a linearly polarized signal transmitter and a linearly polarized signal receiver.

Many wireless communication systems utilize linearly polarized signal transmitters and linearly polarized signal receivers, which experience multipath signal interference. As illustrated in FIG. 1, a linearly polarized signal transmitting antenna 1 sends a linearly polarized signal that is frequently reflected off of one (or more) intervening object(s) 3 (for example, a building) between transmitting antenna 1 and the receiver station, which has a single linearly polarized signal receiving antenna 5. The reflected signal(s) and the initially transmitted linearly polarized signal often travel along multiple paths (indicated by 7 and 9, respectively) from transmitting antenna 1 to receiving antenna 5. Linearly polarized signals are more susceptible to having nulls in time and space domains in signal strength, and nulls in the signal can cause difficulty in implementing a high reliability wireless communication system. For example, when the receiving antenna 5 receives a signal in direct path 9 from transmitting antenna 1, the communication system operates without problems. However, if an additional signal is reflected off intervening object 3, the sum of the reflected and direct signals may be zero, with the result that receiving antenna 5 does not seem to receive any signal. Accordingly, multipath signal interference in systems using linearly polarized signals causes significant difficulty in the design and use of such wireless communication systems.

It is desirable to provide a method and system to improve the signal quality for wireless communication systems so that multipath signal interference is not such a significant problem in the design and use of wireless communication systems.

SUMMARY OF THE INVENTION

The present invention provides a wireless communication system that utilizes a circularly polarized transmitting antenna with dual orthogonal circularly polarized receiving antenna. According to some embodiments, the present invention provides a wireless communication system that includes a first transmitting antenna capable of transmitting first signals having a first type of circular polarization. The transmitting antenna is located at a first location. The system also includes a first receiving antenna capable of receiving second signals having a second type of circular polarization, where the second type of circular polarization is orthogonal to the first type of circular polarization. The system further includes a second receiving antenna capable of receiving third signals having the first type of circular polarization, and the first receiving antenna and the second receiving antenna are both located at a second location. In other embodiments, the present invention may also utilize microwave antenna systems for transmitting a circularly polarized signal and for receiving two orthogonally circularly polarized signals.

According to further embodiments, the present invention provides a method for providing wireless communication having less multipath interference difficulty than the prior art. The method includes the steps of transmitting first signals having a first type of circular polarization from a first transmitting antenna located at a first location, and receiving second signals having a second type of circular polarization at a dual orthogonal circularly polarized antenna located at a second location. The second type of circular polarization is orthogonal to the first type of circular polarization. The method also includes the steps of receiving third signals having the first type of circular polarization at the dual orthogonal circularly polarized antenna located at the second location, and comparing at the second location the relative signal strength of the third signals and the second signals. The method further includes the steps of selecting for processing either of the third signals or the second signals based on greater signal strength, and processing the selected signals to communicate information contained in the first signals.

These and other embodiments of the present invention, as well as its advantages and features, are described in more detail in conjunction with the text below and the attached figures.

DESCRIPTION OF SPECIFIC EMBODIMENTS

The present invention utilizes circularly polarized signal transmitting and receiving antennas to provide a wireless communication system which experiences less difficulty in system design and use from multipath interference than a system utilizing linearly polarized signal transmitting and receiving antennas.

Figure 2:
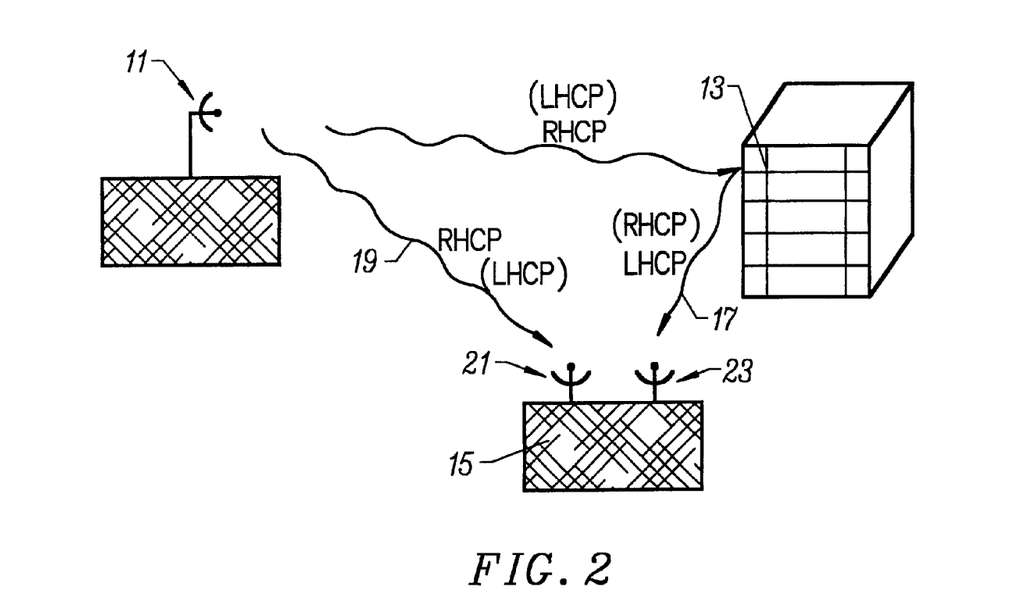
FIG. 2 is a simplified illustration of a wireless communication system using a circularly polarized signal transmitter and dual orthogonal circularly polarized signal receivers, in accordance with the present invention.

FIG. 2 is a simplified illustration of a wireless communication system using a circularly polarized signal transmitter and dual orthogonal circularly polarized signal receivers, in accordance with the present invention. As shown in FIG. 2, a circularly polarized signal transmitting antenna 11 sends a right hand circularly polarized (RHCP) signal that may be reflected off of one (or more) intervening object(s) 13 between the transmitter 11 and a receiver 15. The reflected signal, which becomes a left hand circularly polarized (LHCP) signal, and the initially transmitted RHCP signal travel along multiple paths (indicated by 17 and 19, respectively) from the transmitting antenna 11 to the receiver station 15, which has dual orthogonal circularly polarized signal receiving antennas 21 and 23. Receiving antenna 21 is a RHCP signal receiving antenna, and receiving antenna 23 is a LHCP signal receiving antenna.

Using a circularly polarized signal transmitting antenna and dual circularly polarized signal receiving antenna allows the implementation of a high reliability wireless communication system. For example, when a RHCP signal propagates directly from transmitting antenna 11 to receiver station 15, antenna 21 receives the RHCP signal and antenna 23 receives no signal. Having transmitted the initially transmitted signal from transmitting antenna 11 to receiver station 15, the communication system operates without difficulty. If the RHCP signal transmitted from transmitting antenna 11 is reflected off intervening object 3, the LHCP reflected signal and the initial RHCP signal propagate along paths 17 and 19, respectively, to receiver station 15. At receiver station 15, LHCP signal receiving antenna 23 receives the LHCP signal from reflected path 17. In the event that the direct RHCP signal still exists, RHCP signal receiving antenna 21 receives the RHCP signal from direct path 19. Having received both the initial and the reflected signals, receiver station 15 can discriminate between the signal strength of the two received signals and select one of the two signals to process. Accordingly, problems with multipath signal interference in wireless communication systems using circularly polarized signal transmitting and receiving antenna are minimized, compared to systems using linearly polarized signal transmitting and receiving antenna.

The above description is merely an example which illustrates the advantages of the present invention. The above description is a simplified description of a system which is recognized to have an initially transmitted circularly polarized signal (which is orthogonally circularly polarized with respect to its reflected signals which are reflected an odd number of times before reaching the receiving antenna, and which has the same circular polarization as its reflected signals which are reflected an even number of times). It is recognized that the each circularly polarized receiving antenna in the dual circularly polarized antenna would receive signals having corresponding circular polarization. Although the above description refers to a RHCP transmitting antenna for sending an initially transmitted RHCP signal with a LHCP reflected signal respectively received by antenna 21 and antenna 23, a LHCP transmitting antenna may be used for sending the initially transmitted LHCP signal with a RHCP reflected signal (as shown in parentheses in FIG. 2) respectively received by antenna 23 and antenna 21 in alternative embodiments. Of course, it is recognized that although the above description relates to a single transmitter with a single receiver station, the system may involve multiple transmitting and/or receiving stations utilizing circularly polarized transmitting antenna and dual orthogonal circularly polarized receiving antenna. In addition, it is recognized that the receiver station and the transmitting station discussed above are examples of where transmitting antenna and receiving antenna may be located, but that transmitting antenna and receiving antenna may also be located in other locations which may be mobile rather than fixed.

Figure 3:
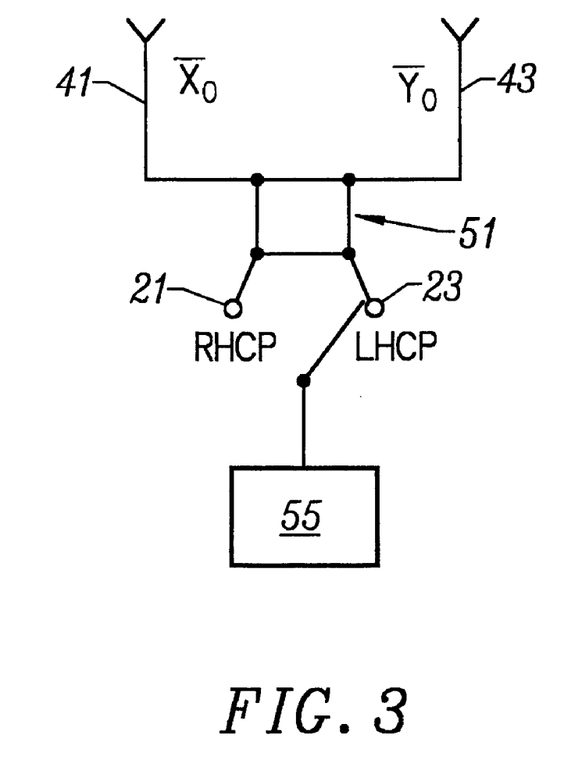
FIG. 3 is a simplified diagram of a dual orthogonal circularly polarized signal receiver that may be used with the system of the present invention.

FIG. 3 is a simplified diagram of the feed excitation of the dual orthogonal circularly polarized signal receiving antenna 21 and 23 at receiver 15 that may be used in accordance wish a specific embodiment of the present invention. RHCP receiving antenna 21 and LHCP receiving antenna 23 can receive circularly polarized signals that are orthogonal in relation to each other. Antenna 21 and 23 may be generated by a coupling network 51 to provide proper phase for elements 41 and 43, which are linear antennas with vertical and horizontal orientation respectively. Two separate corresponding power outputs of RHCP and LHCP can be provided from which a processor 55 at receiver station 15 (FIG. 2) may select based on a comparison of signal amplitude strengths of the RHCP received signal and the LHCP received signal.

In some embodiments, antenna 21 and 22 may be two physically distinct antennas which may be separated and moved in relation to each other at receiver station 15. In other embodiments, antenna 21 and 22 may be integrally formed as a dual circularly polarized feedhorn assembly 100, as described in detail below, for use at receiver station 15. Although the specific embodiments described below illustrate dual orthogonal circularly polarized receiving antenna for a microwave wireless communication system, the invention should not be construed to be so limited.

Figure 4:
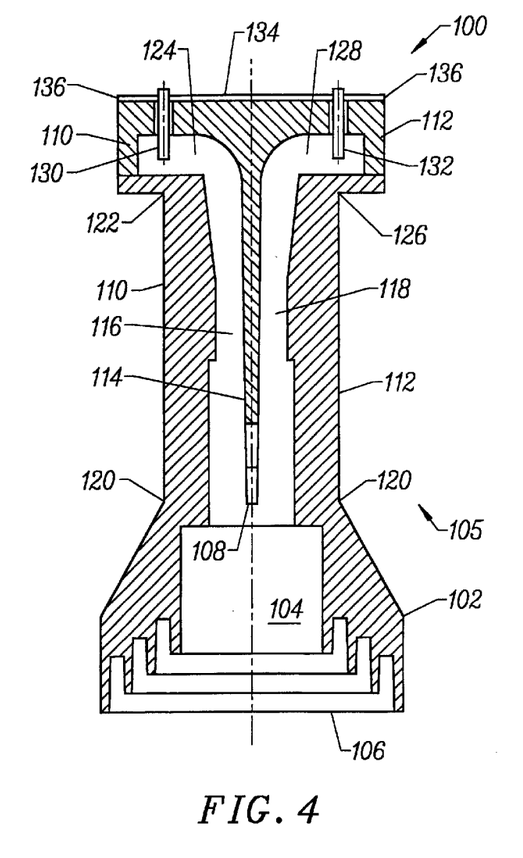
FIG. 4 is a cutaway top view of a dual circularly polarized feedhorn assembly in accordance with one embodiment of the present invention.

FIG. 4 is a cutaway top view of a dual circularly polarized feedhorn assembly 100 in accordance with one embodiment of the present invention Feedhorn assembly 100 includes a feedhorn 102 and a waveguide assembly 105. Use of the term "assembly" herein is not intended to specify any particular technique for joining components or to preclude manufacture of the entire assembly as a single component.

Feedhorn 102 is preferably a standard corrugated feedhorn as shown for equal E and H patterns. Feedhorn 102 defines a cavity 104 with a first aperture 106 representing an input to feedhorn 102 and a second aperture 108 representing an output from feedhorn 102. The terms "input" and "output" here refer to a microwave receiver embodiment of feedhorn assembly 100 that may be used, for example, at receiver station 15 in wireless communication systems discussed earlier in FIGS. 2 and 3, but of course the design of feedhorn assembly 100 will also find application in microwave transmission systems.

Waveguide assembly 105 includes side walls 110 and 112 which in conjunction with a septum 114 define a first waveguide 116 and a second waveguide 118. Septum 114 is aligned with an axis bisecting feedhorn 102. Feedhorn 102 and a first end 120 of waveguide assembly 106 are joined together so that microwave signals may propagate from cavity 104 to first waveguide 116 and second waveguide 118 in a receiver embodiment and in the opposite direction in a transmitter embodiment. First waveguide 116 and second waveguide 118 support the propagation of $TE_{10}$ mode waves.

A bend 122 in side wall 110 defines a rear portion 124 of first waveguide 116. Similarly, a bend 126 in side wall 112 defines a rear portion 128 of second waveguide 118. Rear portions 124 and 128 are obscured from cavity 104.

Within rear portion 124 is a probe 130 for detecting the microwave signal in first waveguide 116. Within rear portion 128 is a probe 132 for detecting the microwave signal in second waveguide 118. Probes 130 and 132 are mounted to a PC board 134 attached to a second end 136 of waveguide housing 105 opposite to first end 120. The configuration of probes 130 and 132 is such that they may both be installed on the same PC board 134.

The operation of feedhorn assembly 100 will now be discussed in reference to a receiver embodiment. Both LHCP and RHCP microwave signals enter first aperture 106 of feedhorn 102. The input signals then travel to septum 114 where they are separated and translated into two linearly polarized $TE_{10}$ modes traveling down the two waveguides separated by the septum. The $TE_{10}$ mode of the LHCP signal travels down second waveguide 118. The $TE_{10}$ mode of the RHCP signal travels down first waveguide 116. Thus, probe 132 monitors the RHCP signal whereas probe 134 monitors the LHCP signal.

As can be seen, the inner surfaces of side walls 110 and 112 are slanted for ease of casting. Septum 114 is also slanted for ease of casting as shown by its slight variation in thickness in FIG. 4.

Figure 5:
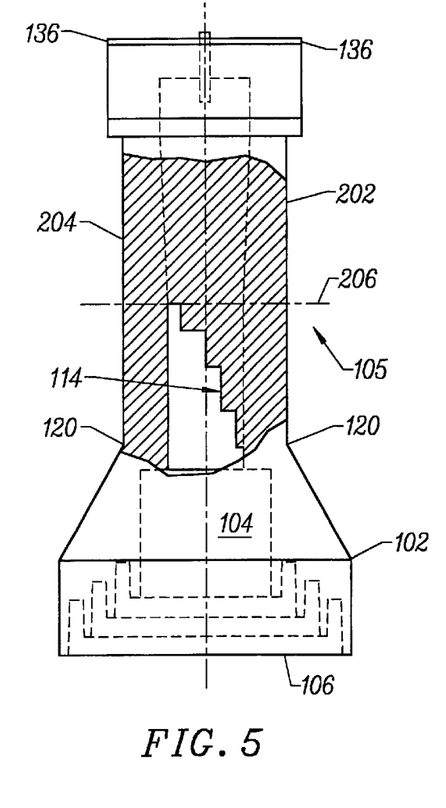
FIG. 5 is a cutaway side view of the dual circularly polarized feedhorn assembly of FIG. 4 in accordance with one embodiment of the present invention.

FIG. 5 is a cutaway side view of the dual circularly polarized feedhorn assembly of FIG. 4 in accordance with one embodiment of the present invention. FIG. 5 depicts the profile of septum 114 which extends from a bottom wall 202 of waveguide assembly 105. Between second end 136 of waveguide housing 105 and an imaginary line 206, septum 114 extends all the way between bottom wall 202 and a top wall 204. Between imaginary line 206 and first end 120, the profile of septum 114 reduces in a series of four steps forming an opening between bottom wall 202 and top wall 204 in the plane of septum 114. The profile of septum 114 is selected to cause the RHCP and LHCP signals to split between first waveguide 116 and second waveguide 118 with excellent isolation.

Figure 6:
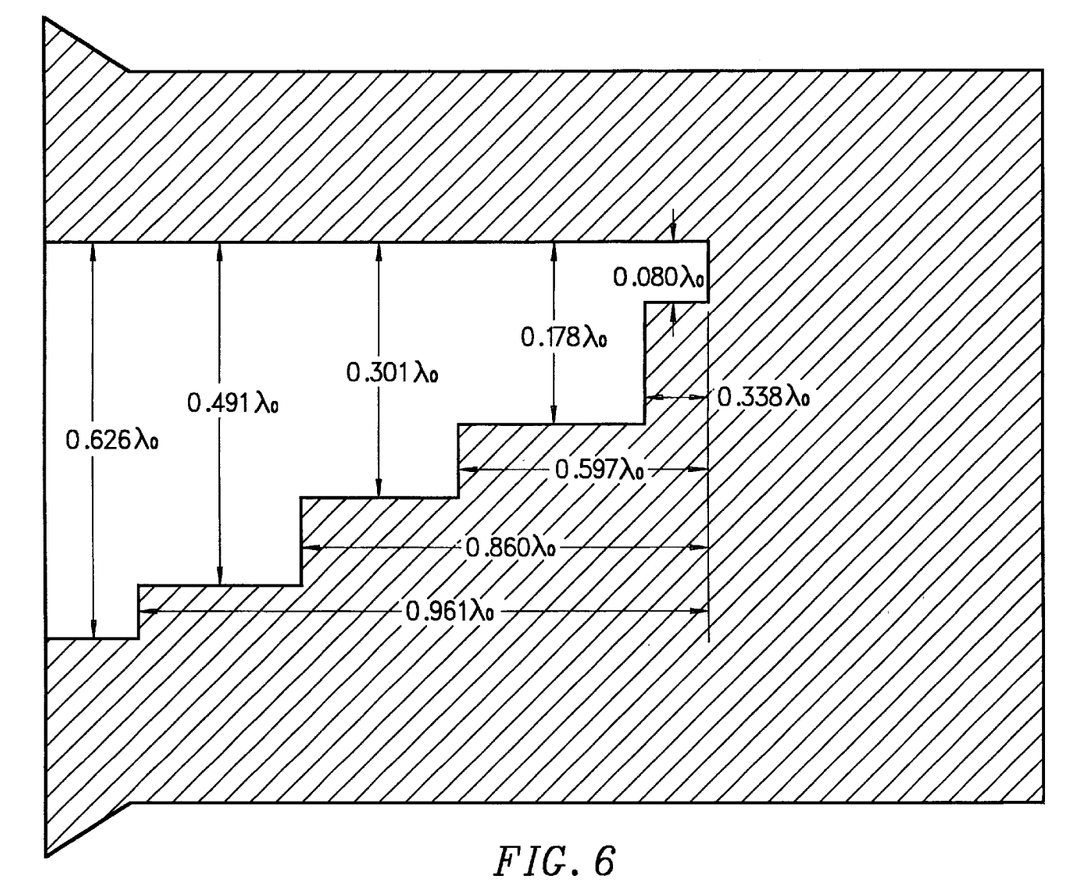
FIG. 6 is a side view of the septum of the dual circularly polarized feedhorn assembly of FIG. 4 in accordance with one embodiment of the present invention.

FIG. 6 is a side view of septum 114 in accordance with one embodiment of the present invention. FIG. 6 is presented to highlight the precise dimensions of septum 114. A first step 302 defines an opening of 0.080 $\lambda_0$ between bottom wall 202 and top wall 204 and extends 0.338 $\lambda_0$ from imaginary line 206. A second step 304 defines an opening of 0.178 $\lambda_0$ between bottom wall 202 and top wall 204 and extends 0.597 $\lambda_0$ from imaginary line 206. A third step 306 defines an opening of 0.301 $\lambda_0$ between bottom wall 202 and top wall 204 and extends 0.860 $\lambda_0$ from imaginary line 206. A fourth step 308 defines an opening of 0.491 $\lambda_0$ between bottom wall 202 and top wall 204 and extends 0.961 $\lambda_0$ from imaginary line 206. After fourth step 308, the opening between bottom wall 202 and top wall 204 has width 0.626 $\lambda_0$. $\lambda_0$ is the free space wavelength at the midband frequency. Of course, the present invention also encompasses other septum dimensions. A similar septum is described in Chen & Tsandoulas, "A Wide-Band Square-Waveguide Array Polarizer," *IEEE Transactions on Antennas and Propagation*, (May 1973), pp. 389–391, the contents of which are herein incorporated by reference.

Figure 7:
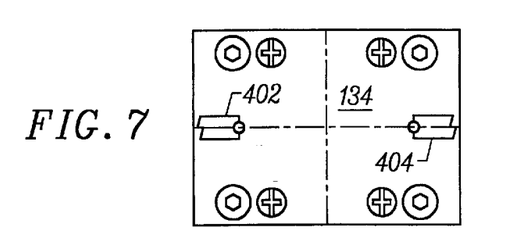
FIG. 7 is a top view of a microstrip structure usable in conjunction with the dual circularly polarized feedhorn assembly in accordance with one embodiment of the present invention.

FIG. 7 is a top view of PC board 134 in accordance with one embodiment of the present invention. A microstrip structure 402 is coupled to probe 130 to transmit the RHCP signal to a standard SMA connector. Similarly, a microstrip structure 404 is coupled to probe 132 to transmit the LHCP signal to a standard SMA connector. In a transmission system embodiment of FIG. 7, probes 130 and 132 operate to energize first waveguide 116 and second waveguide 118 with RHCP and LHCP signals respectively. The SMA connectors connected respectively to probes 130 and 132 of feedhorn assembly 100 can be connected to respective power detectors to a switch controlled by a processor having inputs from the power detectors, according to some embodiments. Thus, the processor may detect whether the probe transmitting the LHCP signal or the probe transmitting the RHCP signal provides the stronger signal, then selectively switch between the signals (either the received LHCP signal or the received RHCP signal) to process the stronger signal, as discussed in relation to FIGS. 2 and 3.

Figure 8:
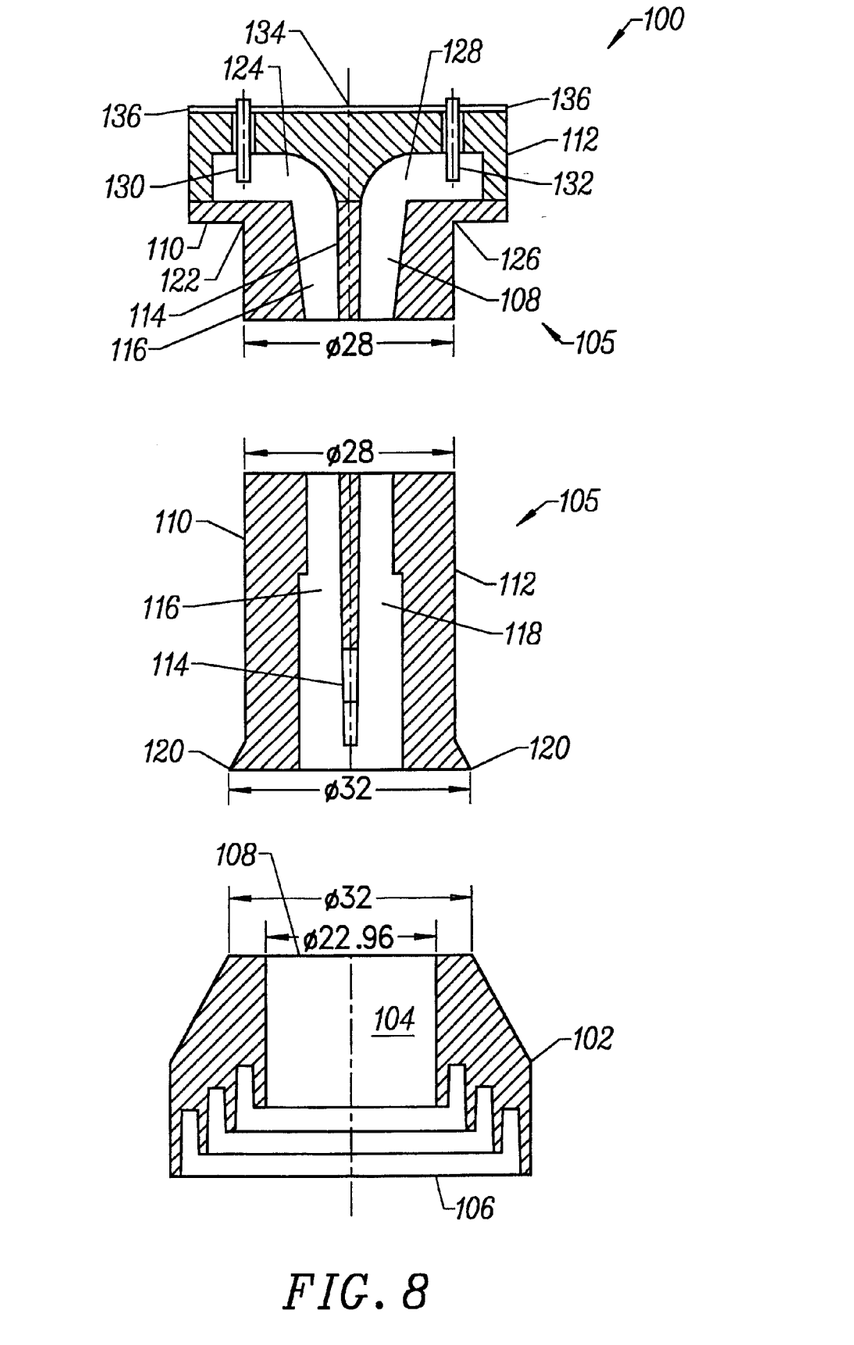
FIG. 8 is an exploded top view of a dual circularly polarized feedhorn assembly in accordance with one embodiment of the present invention.

The proportions of feedhorn assembly 100 are shown for an embodiment optimized for use in the 10.9 GHz to 12.8 GHz band. FIG. 8 is an exploded view of feedhorn assembly 100 with various dimensions shown in millimeters. Note that the internal square cross section of waveguide assembly 105 is 0.692 $\lambda_0 \times 0.692 \lambda_0$. It should be noted that FIGS. 4–8 are all drawn substantially to scale.

The invention has now been explained with reference to specific embodiments. Other embodiments will be apparent to those of ordinary skill in the art in view of the foregoing description. For example, although the embodiment of feedhorn assembly 100 described is for use in the 10.9–12.8 GHz band, other bands may be used for other embodiments of feedhorn assembly 100 having different dimensions. Also, although a microwave feedhorn assembly 100 having dual orthogonal circularly polarized receiving antenna is described for use in the wireless communication system of FIG. 2, other types of dual orthogonal circularly polarized receiving antenna may also be used in non-microwave wireless communication systems. It is therefore not intended that this invention be limited except as indicated by the appended claims and their full scope of equivalents.

What is claimed is:

1. A wireless communication system having a multipath signal detection and discrimination capability, the system comprising:

a first transmitting antenna capable of transmitting first signals having a first type of circular polarization, said first transmitting antenna located at a first location;

a first receiving antenna capable of receiving second signals having a second type of circular polarization, while excluding the first signals, said second type of circular polarization being orthogonal to said first type of circular polarization;

a second receiving antenna capable of receiving third signals having said first type of circular polarization, while excluding the second signals, said first receiving antenna and said second receiving antenna both located at a second location; and a processor coupled to said first receiving antenna and said second receiving antenna, said processor capable of processing selected signals, said selected signals being selected from either of said second signals or said third signals, said selected signals having a greater signal strength than the unselected signals, said processor located at said second location wherein said first transmitting antenna and said first and second receiving antennas comprise a first single circular polarized transmission/dual orthogonal circular polarized reception pair in a multiple antenna system, and wherein said first and second receiving antennas further comprise a dual orthogonal circularly polarized feedhorn assembly comprising:

a feedhorn to communicate microwave signals, said microwave signals comprising said second and third signals, said feedhorn defining a cavity; and a waveguide housing having a first waveguide and a second waveguide in communication with said cavity at a first end of said waveguide housing so as to propagate microwave signals between said cavity and said first and second waveguides;

said waveguide housing comprising:

a bottom wall common to said first and second waveguides;

a septum attached to said bottom wall and to a second end of said waveguide housing opposite said first end so as to partially separate said first waveguide from said second waveguide, said septum having a shape causing a right hand circularly polarized signal and a left hand circularly polarized signal received from said cavity to separate into said first and second waveguides respectively; and walls of said waveguide housing defining bends in said first waveguide and second waveguide where said septum is attached to said second end of said housing so that rear portions of said first waveguide and said second waveguide are obscured from said cavity.

2. The system of claim 1 wherein first and second side walls of said first and second waveguides respectively are slanted for ease of manufacture.

3. The system of claim 1 wherein said septum is slanted for ease of manufacture.

4. The system of claim 1 wherein said dual orthogonal circularly polarized feedhorn assembly comprises:

a first probe inserted in said rear portion of said first waveguide so as to monitor said right hand circularly polarized signal; and a second probe inserted in said rear portion of said second waveguide so as to monitor said left hand circularly polarized signal, wherein each of said first probe and said second probe are coupled to a 50 ohm microstrip structure.

5. The system of claim 4 wherein said septum has a profile extending from said bottom wall to a top wall of said waveguide housing at said second end and reducing in steps toward said first end of said waveguide housing.

6. The system of claim 5 wherein said profile consists of four steps.

7. The system of claim 6 wherein at a first step closest to said second end defines an imaginary line extends for approximately $0.338 \lambda_0$, a second step extends to approximately $0.597 \lambda_0$ from a beginning of said first step, a third step extends to approximately $0.860 \lambda_0$ from said beginning of said first step, and a fourth step extends to approximately $0.491 \lambda_0$ between said top wall and said bottom wall, wherein $\lambda_0$ is a free space wavelength at a midband frequency of operation.

8. The system of claim 7 wherein said first step defines an opening of approximately $0.080 \lambda_0$ between said top wall and said bottom wall, said second step defines an opening of approximately $0.178 \lambda_0$ between said top wall and said bottom wall, said third step defines an opening of approximately $0.301 \lambda_0$ between said top wall and said bottom wall, and said fourth step defines an opening of approximately $0.491 \lambda_0$ between said top wall and said bottom wall, wherein $\lambda_0$ is a free space wavelength at a midband frequency of operation.

9. The system of claim 7 wherein said desired frequency is in a range between 10.9 and 12.8 GHz.

10. A wireless communication system having a multipath signal detection and discrimination capability, the system comprising:

a first transmitting antenna capable of transmitting first signals having a first type of circular polarization, said first transmitting antenna located at a first location;

a first receiving antenna capable of receiving second signals having a second type of circular polarization, said second type of circular polarization being orthogonal to said first type circular polarization; and a second receiving antenna capable of receiving third signals having said first type of circular polarization, said first receiving antenna and said second receiving antenna both located at a second location, wherein said first and second receiving antennas comprise a dual orthogonal circularly polarized feedhorn assembly comprising:

a feedhorn to communicate microwave signals, said microwave signals comprising said second and third signals, said feedhorn defining a cavity; and a waveguide housing having a first waveguide and a second waveguide in communication with said cavity at a first end of said waveguide housing so as to propagate microwave signals between said cavity and said first and second waveguides;

said waveguide housing comprising:

a bottom wall common to said first and second waveguides;

a septum attached to said bottom wall and to a second end of said waveguide housing opposite said first end so as to partially separate said first waveguide from said second waveguide, said septum having a shape causing a right hand circularly polarized signal and a left hand circularly polarized signal received from said cavity to separate into said first and second waveguides respectively; and walls of said waveguide housing defining bends in said first waveguide and second waveguide where said septum is attached to said second end of said housing so that rear portions of said first waveguide and said second waveguide are obscured from said cavity.

* * * * *